US010200566B2

(12) United States Patent
Tsuji

(10) Patent No.: US 10,200,566 B2
(45) Date of Patent: Feb. 5, 2019

(54) ELECTRONIC APPARATUS THAT PERFORMS USER AUTHENTICATION

(71) Applicant: KYOCERA Document Solutions Inc., Osaka (JP)

(72) Inventor: Hiroyuki Tsuji, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/822,132

(22) Filed: Nov. 25, 2017

(65) Prior Publication Data

US 2018/0152598 A1 May 31, 2018

(30) Foreign Application Priority Data

Nov. 25, 2016 (JP) .................................. 2016-228741

(51) Int. Cl.
*H04N 1/00* (2006.01)
*H04N 1/44* (2006.01)

(52) U.S. Cl.
CPC ....... *H04N 1/4413* (2013.01); *H04N 1/00042* (2013.01); *H04N 1/00074* (2013.01); *H04N 2201/0094* (2013.01)

(58) Field of Classification Search
CPC .... G06F 3/1222; G06F 3/1238; G06F 3/1247; G06F 3/1267; G06F 3/1288; H04L 41/08;

(Continued)

(56) References Cited

U.S. PATENT DOCUMENTS 6,023,595 A * 2/2000 Suzuki .................. G03G 15/55
  324/511
9,626,506 B1 * 4/2017 Shetty ..................... G06F 21/46
(Continued)

FOREIGN PATENT DOCUMENTS

JP    2015-114853 A    6/2015

*Primary Examiner* — Negussie Worku
(74) *Attorney, Agent, or Firm* — Hawaii Patent Services; Nathaniel K. Fedde; Kenton N. Fedde

(57) ABSTRACT

An electronic apparatus is obtained that suppresses a decrease in convenience to a legitimate user while reducing the possibility of unauthorized login. In the electronic apparatus, a user-interface unit displays a user-authentication screen, and detects operation for confirming a character string that is inputted in an input field. The user-authentication unit, when this operation is detected, executes user authentication based on the character string that is inputted in the input field and a pre-registered password. The user-authentication unit considers user authentication as having failed at least one time even though the character string is a correct password. The user-interface unit, (a) when the character string is not a correct password and user authentication has failed, clears the character string that is inputted in the input field. Then the user-interface unit monitors whether or not user operation of an operation unit or re-input of a character string in the input field is detected. The user-interface unit, (b) when user authentication has failed even though the character string is a correct password, does not clear the character string that is inputted in the input field. Then, the user-interface unit monitors whether or not user operation of an operation unit or re-input of a character string in the input field is detected.

4 Claims, 4 Drawing Sheets

(58) Field of Classification Search
CPC ..... H04L 41/084; H04L 63/101; H04L 67/02; H04L 67/10; H04L 67/2842; H04L 67/2852; H04L 41/0213; H04L 43/065; H04N 1/00212; H04N 1/00233
USPC ................. 358/1.15, 1.12, 1.13; 709/223
See application file for complete search history.

(56) References Cited

U.S. PATENT DOCUMENTS

| | | | | |
|---|---|---|---|---|
| 9,854,056 | B2* | 12/2017 | Kato | H04L 67/2852 |
| 2008/0282021 | A1* | 11/2008 | Tokashiki | H04N 5/907 |
| | | | | 711/100 |
| 2011/0235870 | A1* | 9/2011 | Ichikawa | G06F 21/32 |
| | | | | 382/118 |
| 2012/0210408 | A1* | 8/2012 | Lu | H04L 63/0846 |
| | | | | 726/6 |
| 2013/0208300 | A1* | 8/2013 | Sakura | G06K 15/4045 |
| | | | | 358/1.14 |
| 2015/0304446 | A1* | 10/2015 | Kato | H04L 63/101 |
| | | | | 709/223 |
| 2016/0065569 | A1* | 3/2016 | Tran | H04L 63/0861 |
| | | | | 726/7 |
| 2016/0142585 | A1* | 5/2016 | To | H04N 1/4413 |
| | | | | 358/1.14 |
| 2016/0381162 | A1* | 12/2016 | Sasaki | H04W 4/008 |
| | | | | 709/217 |
| 2017/0109508 | A1* | 4/2017 | Semoto | G06F 21/31 |
| 2017/0318189 | A1* | 11/2017 | Asakimori | H04N 1/4413 |
| 2018/0007549 | A1* | 1/2018 | Sanders | H04W 12/06 |
| 2018/0013758 | A1* | 1/2018 | Yu | H04L 63/0846 |
| 2018/0082067 | A1* | 3/2018 | Yamaguchi | G06F 21/602 |
| 2018/0088879 | A1* | 3/2018 | Tonegawa | G06F 3/1238 |
| 2018/0332472 | A1* | 11/2018 | Lu | H04L 29/06 |

* cited by examiner

ELECTRONIC APPARATUS THAT PERFORMS USER AUTHENTICATION

INCORPORATION BY REFERENCE

This application is based on and claims the benefit of priority from Japanese Patent Application No. 2016-228741 filed on Nov. 25, 2016, the contents of which are hereby incorporated by reference.

BACKGROUND

The present disclosure relates to an electronic apparatus that performs user authentication.

A typical information processing apparatus determines whether or not password input has been received plural times based on user ID information that is received from a user. When it is determined that password input has been received plural times, notification of login failure is performed regardless of whether or not the inputted password is correct, and login is allowed when input of a correct password is received a specified number of times.

SUMMARY

The electronic apparatus according to the present disclosure includes a user-interface unit and a user-authentication unit. The user-interface unit displays a user-authentication screen having a password input field on a specified display apparatus, and detects user operation of an operation unit for confirming a character string that is inputted in the input field. The user-authentication unit, when user operation of the operation unit is detected, executes user authentication based on a character string that is inputted in the input field and a pre-registered password. The user-authentication unit considers user authentication as having failed at least one time even though the character string is a correct password. The user-interface unit, (a) when the user-authentication unit determines during the user authentication that the character string is not a correct password and that the user authentication has failed, clears the character string that is inputted in the input field. Then the user-interface unit monitors whether or not user operation of the operation unit or re-input of a character string in the input field is detected. The user-interface unit, (b) when the user-authentication unit determines during the user authentication that the user authentication has failed even though the character string is a correct password, does not clear the character string that is inputted in the input field. Then the user-interface unit monitors whether or not user operation of the operation unit or re-input of a character string in the input field is detected.

DETAILED DESCRIPTION

In the following, embodiments according to the present disclosure will be explained based on the drawings.

Figure 1:
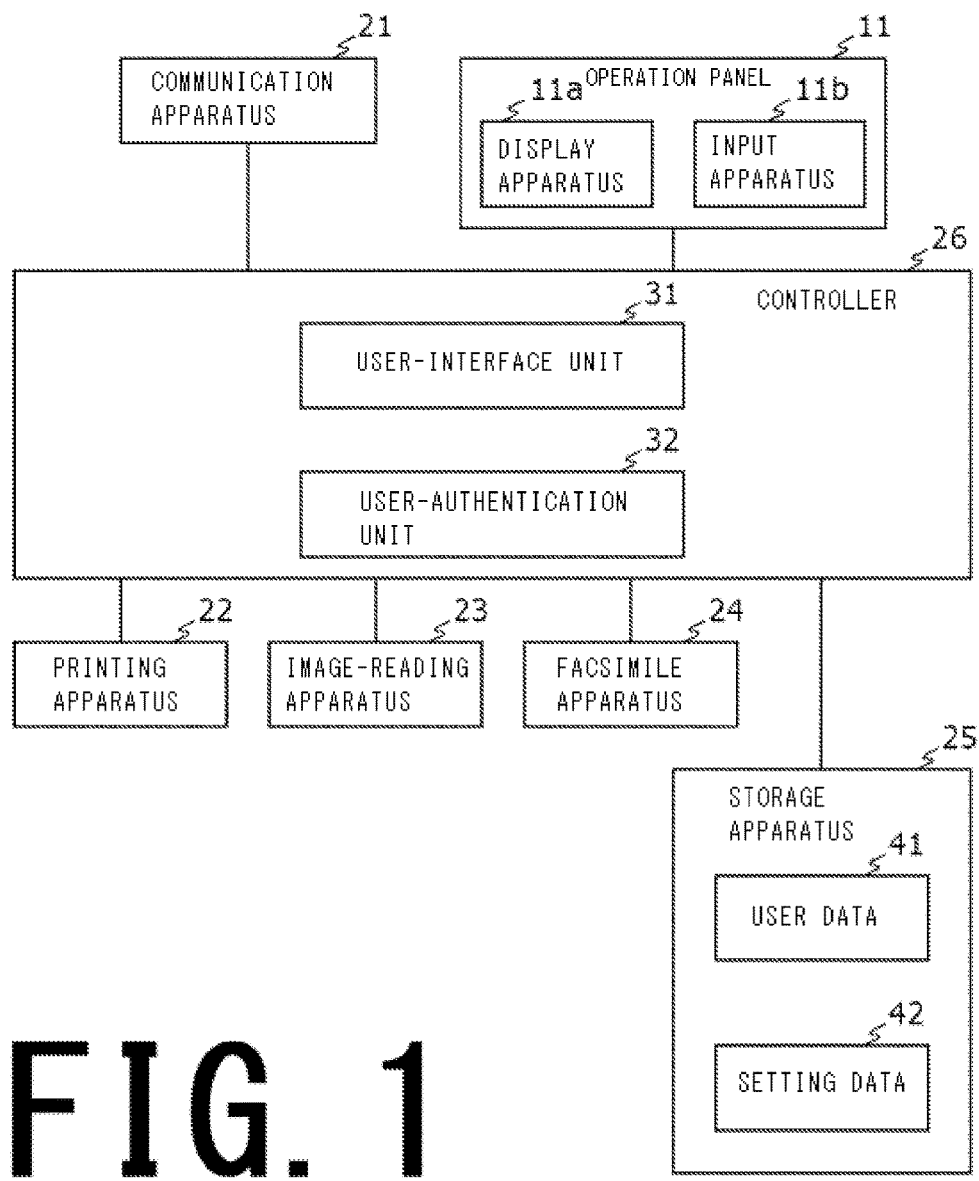
FIG. 1 is a block diagram illustrating the configuration of an image forming apparatus as an example of an electronic apparatus according to an embodiment of the present disclosure.

FIG. 1 is a block diagram illustrating the configuration of an image forming apparatus as an example of an electronic apparatus according to an embodiment of the present disclosure.

In this embodiment, the image forming apparatus illustrated in FIG. 1 is a MFP having a printing function, an image-reading function and a facsimile function. This image forming apparatus includes an operation panel 11, a communication apparatus 21, a printing apparatus 22, an image-reading apparatus 23, a facsimile apparatus 24, a storage apparatus 25 and a controller 26.

The operation panel 11 includes a display apparatus 11a such as a liquid-crystal display or the like, and an input apparatus 11b such as a touch panel or the like, and displays an operation screen for a user, and performs detection of an input operation of a user. The display apparatus 11a displays an operation screen for a user, and the input apparatus 11b receives a user operation that is inputted by a user.

Figure 2:
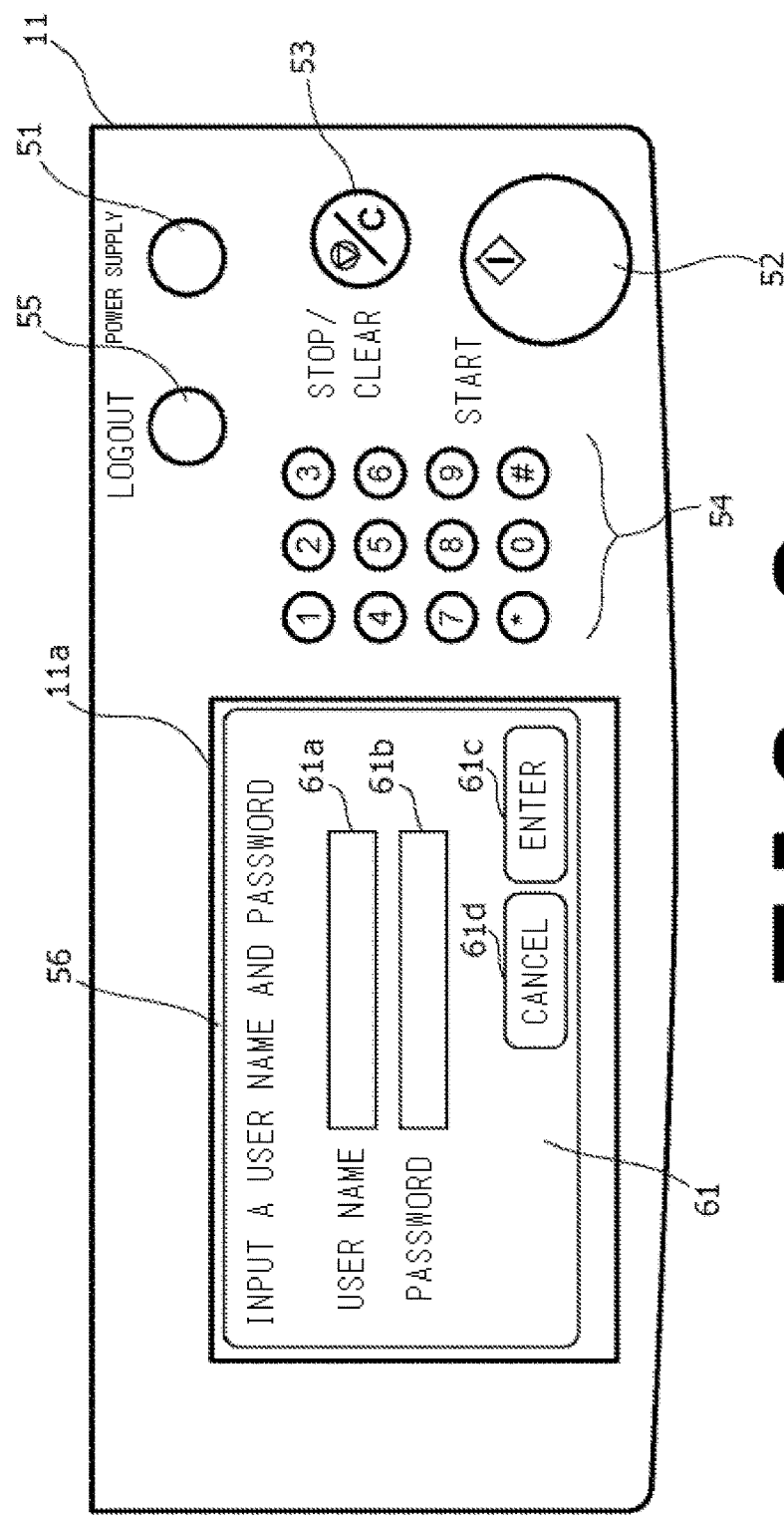
FIG. 2 is a front view illustrating the operation panel 11 in FIG. 1.

FIG. 2 is a front view illustrating the operation panel 11 in FIG. 1. The operation panel 11 illustrated in FIG. 2 has hard keys 51 to 55 and a touch panel 56 as an input apparatus 11b. Hard key 51 is a power-supply key, hard key 52 is a start key, hard key 53 is a stop/clear key, hard key 54 is a numeric keypad, and hard key 55 is a logout key. The touch panel 56 is arranged on the display surface of the display apparatus 11a.

The communication apparatus 21 can be connected to a host apparatus via a network, and is an apparatus that performs data communication using a specified communication protocol.

Moreover, the printing apparatus 22 is an internal device that prints a document image on printing paper using an electrophotographic method, for example.

Furthermore, the image-reading apparatus 23 is an internal device that optically reads a document image from a document, and generates image data of the document image.

Moreover, the facsimile apparatus 24 is an internal device that has a receiving function that receives a facsimile signal and converts that facsimile signal to image data, and a transmitting function that converts image data to a facsimile signal and transmits that facsimile signal.

Furthermore, the storage apparatus 25 is a nonvolatile storage apparatus such as a hard disk drive, a flash memory and the like, and stores data, programs and the like. The storage apparatus 25 stores user data 41 and setting data 42.

User data 41 includes correct user names (user IDs) of registered users, and passwords. Setting data 42 includes the number of times of forced error judgment (described later).

Moreover, the controller 26 has a computer that has a CPU, a ROM, a RAM and the like. The controller 26 loads a program that is stored in ROM or the storage apparatus 25 to RAM, and by the CPU executing that program, the controller 26 operates as various processing units.

In this embodiment, the controller 26 operates as a user-interface unit 31, and a user-authentication unit 32.

The user-interface unit 31, together with causing the display apparatus 11a of the operation panel 11 to display a screen, causes the screen that is displayed by the display apparatus 11a to transition according to an input operation that is detected by the input apparatus 11b of the operation panel 11.

Moreover, the user-interface unit 31 displays a user-authentication screen 61 as illustrated in FIG. 2 on a specified display apparatus 11a. The user-authentication screen 61 includes a user name input field 61a, a password input field 61b, an enter key 61 as a soft key, and a cancel key 61d as a soft key.

Moreover, the user-interface unit 31 detects user operation of the operation unit for confirming a character string that is inputted in the input fields 61a, 61b. In this embodiment, as this operation unit, the enter key 61c is used as a soft key, and user operation of the enter key 61c is detected by the touch panel 56. As this operation unit a specified hard key may also be used.

When the user operation of the operation unit described above is detected (here, when pressing of the enter key 61c is detected by the touch panel 56), the user-authentication unit 32 executes user authentication based on character strings that are inputted in the input fields 61a, 61b and a password that is registered beforehand in the user data 41.

Furthermore, the user-authentication unit 32 regards user authentication as having failed at least one time even when the character string that is inputted in the input field 61b is a correct password (a correct password corresponding to the user name that is inputted in the input field 61a).

The user-interface unit 31, (a) when the user-authentication unit 32 determines that the character string that is inputted in the input field 61b during user authentication described above is not a correct password and that user authentication failed, clears the character string that is inputted in the input field 61b. Then, the user-interface unit 31 monitors whether or not user operation of the operation unit described above (here, enter key 61c), or re-input of a character string in the input field 61b is detected. The user-interface unit 31, (b) when it is forcibly determined that user authentication failed even though the character string that is inputted in the input field 61b during user authentication described above is a correct password, does not clear the character string that is inputted in the input field 61b. Then, the user-interface unit 31 monitors whether or not user operation of the operation unit described above (here, enter key 61c), or re-input of a character string in the input field 61b is detected.

Furthermore, in this embodiment, the user-authentication unit 32, (a) reads the setting data 42 and specifies the number of times of forced error judgment. Then, (b1) when the number of times that the character string that is inputted in the input field 61b is the correct password is equal to or less than the number of times of forced error judgment, the user-authentication unit 32 considers that user authentication failed. Moreover, (b2) when the number of times that the character string that is inputted in the input field 61b is the correct password is greater than the number of times of forced error judgment, the user-authentication unit 32 considers that user authentication is successful.

Moreover, after the user-authentication unit 32 determines that user authentication failed even though the character string that is inputted in the input field 61b during user authentication described above is the correct password, and the user-interface unit 31, without clearing the character string that is inputted in the input field 61b, is monitoring whether or not there is user operation of the operation unit (here, the enter key 61c) or there is re-input of a character string in the input field 61b, the user-interface unit 31 performs the following processing. (a) When user operation of the operation unit described above (here, the enter key 61c) is detected, the user-interface unit 31 increases the number of times that the character string that is inputted in the input field 61b is continuously the correct password by 1. Then, (b) when re-input of a character string in the input field 61b is detected, the user-interface unit 31 clears the character string that is inputted in the input field 61b.

Figure 3:
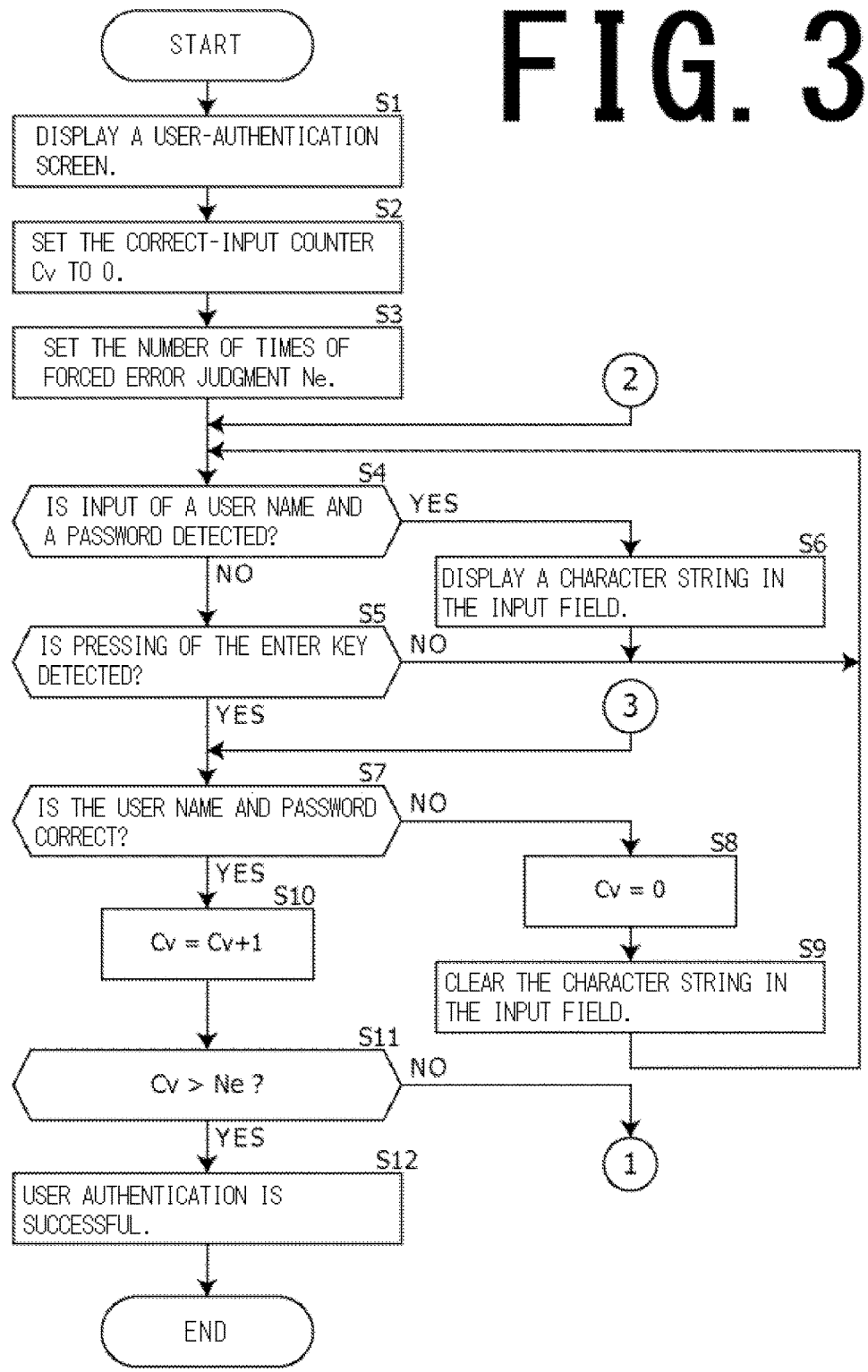
FIG. 3 is a flowchart (1/2) that explains the operation of the image forming apparatus illustrated in FIG. 1.
Figure 4:
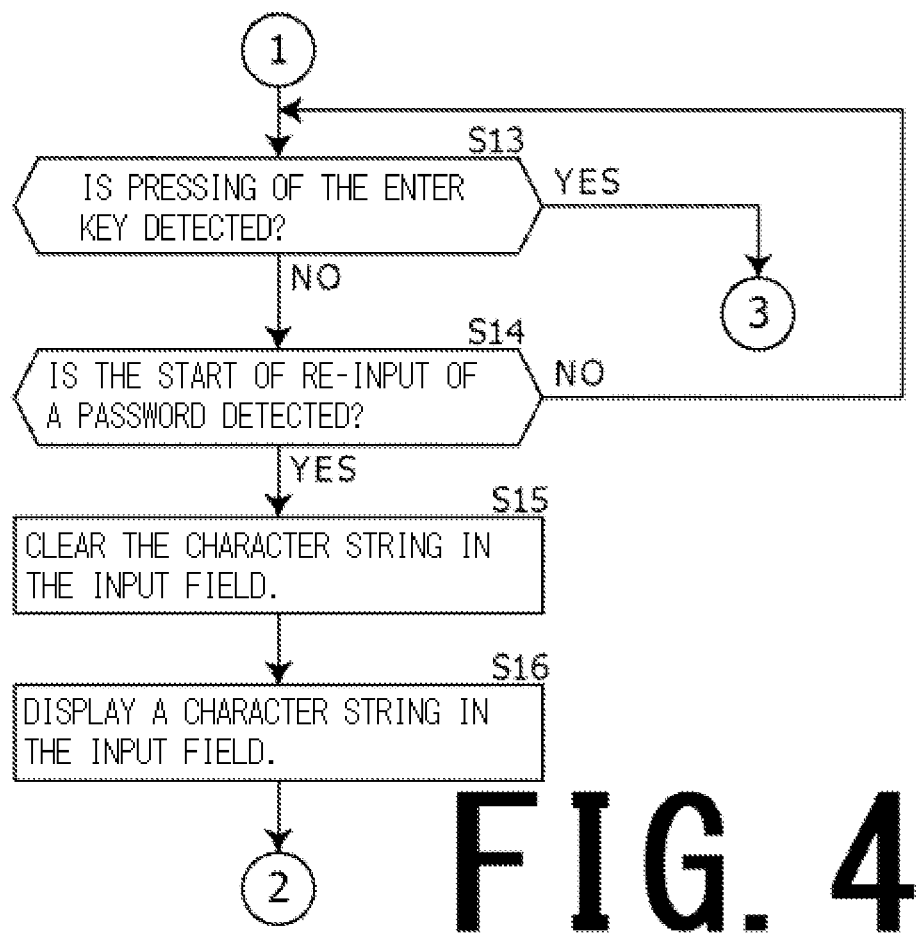
FIG. 4 is a flowchart (2/2) that explains the operation of the image forming apparatus illustrated in FIG. 1.

Next, the operation of the image forming apparatus above will be explained. FIG. 3 and FIG. 4 are flowcharts that explain the operation of the image forming apparatus illustrated in FIG. 1.

For example, when activating the image forming apparatus, the user-interface unit 31 displays a user-authentication screen on the display apparatus 11a (step S1). The user-authentication unit 32 sets a correct-input counter Cv to 0 (step S2), and based on the setting data 42, sets the number of times of forced error judgment Ne (step S3). The number of times of forced error judgment Ne is set to a specified value of 1, or 2 or greater.

Then, the user-interface unit 31 monitors whether or not input of character strings (user name and password) for input fields 61a, 61b is detected (step S4), and whether or not pressing of the enter key 61c is detected (step S5).

Then, when input of character strings (user name and password) for the input fields 61a, 61b is detected, the user-interface unit 31 displays the inputted character strings in the input fields 61a, 61b (step S6).

However, when pressing of the enter key 61c is detected, the user-authentication unit 32, by comparing the character string that is currently inputted in input field 61b with the correct password that corresponds to the user name that is currently inputted in the input field 61a, determines whether or not the character strings that are inputted in the input fields 61a, 61b are a correct user name and password (step S7).

When the character strings that are inputted in the input fields 61a, 61b are not a correct user name and password, the user-authentication unit 32 resets the correct-input counter Cv to 0 (step S8). Then, the user-interface unit 31 clears the character string in the input field 61b (step S9), and returns to monitoring in steps S4 and S5.

On the other hand, when the character strings that are inputted in the input fields 61a, 61b are a correct user name and password, the user-authentication unit 32 increases the correct-input counter Cv by 1 (step S10), and determines whether or not the correct-input counter Cv is greater than the number of time of forced error judgment Ne (step S11). Then, when the correct-input counter Cv is greater than the number of times of forced error judgment Ne, the user-authentication unit 32 determines that user authentication is successful, and allows login (step S12). When login is allowed by the user-authentication unit 32, the user-interface unit 31 displays an operation screen (initial menu screen or the like) for that user on the display apparatus 11a.

On the other hand, in step S11 when the correct-input counter Cv is not greater than the number of times of forced error judgment Ne, the user-interface unit 31 monitors whether or not pressing of the enter key 61c is detected (step S13), and monitors whether or not the start of re-input of characters strings (user name and password) for the input fields 61a, 61b is detected (step S14).

Then, at this time, when pressing of the enter key 61c is detected, processing returns to step S7, and the user-authentication unit 32 determines whether or not the character strings that are currently inputted in the input fields 61a, 61b are a correct user name and password (step S7).

In other words, when pressing of the enter key 61c is detected immediately after it is determined that the character strings that are inputted in the input fields 61a, 61v are a correct user name and password, the correct-input counter Cv is increased by 1 without the user re-inputting the correct password.

However, at this time, when the start of re-input of character strings (user name and password) for the input fields 61a, 61b is detected, the user-interface unit 31 clears the character string in the input field 61b (step S15). Then, the user-interface unit 31 displays the re-inputted character string in the input field 61b (step S16), and returns to the monitoring in steps S4 and S5.

As described above, according to the embodiment above, the user-interface unit 31 displays a user-authentication screen 61 having a password input field 61a on a specified display apparatus 11a. Then the user-interface unit 31 detects user operation of an operation unit (here, the enter key 61c) for confirming the character string that is inputted in the input field 61a. The user-authentication unit 32 considers at least one time that user authentication fails even when the character string that is inputted in the input field 61b is a correct password. The user-interface unit 31, (a) when it is determined that the character string that is inputted in the input field 61b is not a correct password and that user authentication has failed, clears that character string. Then, the user-interface unit 31 monitors whether or not there is user operation of the operation unit above, or re-input of a character string in input field 61b. Moreover, the user-interface unit 31, (b) when it is determined that user authentication has failed even though the character string that is inputted in the input field 61b is the correct password, does not clear that character string. Then, the user-interface unit 31 monitors whether or not user operation of the operation unit above, or re-input of a character string in input field 61b is detected.

As a result, the possibility of unauthorized login due to a round-robin password attack is reduced, and a decrease in convenience to a legitimate user is suppressed. For example, even when a round-robin password attack is being received, a password that is different from the previous password is inputted each time, so user authentication is not successful.

Various changes and modification to the embodiment described above will be apparent to one skilled in the art. Such changes and modifications may be made without departing from the spirit and scope of the subject matter, and without weakening the intended advantages. In other words, such changes and modifications are intended to be included within the scope of the claims.

In a typical information processing apparatus described above, notification of an unsuccessful login is performed regardless of whether or not the inputted password is correct, so an unsuccessful login notification is displayed even though the user may have inputted a correct password. Therefore, there is a possibility that the user may not know the login method and become confused before login is allowed.

According to the present disclosure, the possibility of unauthorized login due to a round-robin password attack is reduced, and a decrease in convenience to a legitimate user is suppressed.

The present disclosure can be applied to an image forming apparatus such as a MFP and the like.

What is claimed is:

1. An electronic apparatus comprising a controller and a storage apparatus on which a program is stored, wherein the controller can execute the program to operate as:
    a user-interface unit that displays a user-authentication screen having a password input field on a specified display apparatus, and detects user operation of an operation unit for confirming a character string that is inputted in the input field; and
    a user-authentication unit that, when the user operation of the operation unit is detected, executes user authentication based on a character string that is inputted in the input field and a pre-registered password; wherein
    the user-authentication unit considers the user authentication as having failed at least one time even though the character string is a correct password; and
    the user-interface unit, (a) when the user-authentication unit determines during the user authentication that the character string is not a correct password and that the user authentication has failed, clears the character string that is inputted in the input field, and monitors whether or not user operation of the operation unit or re-input of a character string in the input field is detected, and (b) when the user-authentication unit determines during the user authentication that the user authentication has failed even though the character string is a correct password, does not clear the character string that is inputted in the input field, and monitors whether or not user operation of the operation unit or re-input of a character string in the input field is detected.

2. The electronic apparatus according to claim 1, wherein the user-authentication unit, (a) identifies a specified number of times of forced error judgment, and (b1) when the number of times that the inputted character string is continuously the correct password is equal to or less than the number of times of forced error judgment, considers the user authentication as having failed, and (b2) when the number of times that the inputted character string is continuously the correct password is greater than the number of times of forced error judgment, considers the user authentication as being successful.

3. The electronic apparatus according to claim 2, wherein when
    the user-interface unit does not clear the character string that is inputted in the input field after the user-authentication unit determines during the user authentication that the user authentication has failed even though the character string is the correct password, and is monitoring whether or not user operation of the operation unit or re-input of a character string in the input field is detected, increases the number of times that the inputted character string is continuously a correct password by 1 when user operation of the operation unit is detected.

4. The electronic apparatus according to claim 1, wherein when the user-interface unit does not clear the character string that is inputted in the input field after the user-authentication unit determines during the user authentication that the user authentication has failed even though the character string is the correct password, and is monitoring whether or not user operation of the operation unit or re-input of a character string in the input field is detected, clears the character string that is inputted in the input field when re-input of a character string in the input field is detected.

* * * * *